(12) United States Patent
Turnbull

(10) Patent No.: US 6,922,473 B2
(45) Date of Patent: Jul. 26, 2005

(54) DUAL MODE TRANSMISSION DEVICE

(75) Inventor: James Turnbull, San Diego, CA (US)

(73) Assignee: Jabra Corporation, San Diego, CA (US)

( * ) Notice: Subject to any disclaimer, the term of this patent is extended or adjusted under 35 U.S.C. 154(b) by 381 days.

(21) Appl. No.: 10/212,029

(22) Filed: Aug. 1, 2002

(65) Prior Publication Data

US 2004/0022395 A1 Feb. 5, 2004

(51) Int. Cl.$^7$ ................................................ H04R 1/10
(52) U.S. Cl. .................... 381/74; 381/110; 381/123; 381/376; 455/78; 455/569.1
(58) Field of Search ........................... 381/74, 110, 123, 381/376; 367/197–199; 704/275; 379/167.01; 455/78–79, 569.1

(56) References Cited

U.S. PATENT DOCUMENTS

| | | | | |
|---|---|---|---|---|
| 4,374,301 A | * | 2/1983 | Frieder, Jr. .................. 379/430 |
| 4,551,854 A | * | 11/1985 | Rutty et al. .................... 455/78 |
| 4,885,796 A | * | 12/1989 | Loftus et al. ............... 455/11.1 |
| 5,136,555 A | * | 8/1992 | Gardos ........................ 367/132 |
| 5,555,533 A | * | 9/1996 | Peck ............................ 367/132 |
| 5,715,321 A | * | 2/1998 | Andrea et al. ................. 381/92 |
| 6,272,361 B1 | * | 8/2001 | Courtis et al. ........... 455/569.1 |
| 6,608,908 B1 | * | 8/2003 | Galet et al. ................. 381/376 |

* cited by examiner

Primary Examiner—Huyen Le
Assistant Examiner—Con P. Tran
(74) Attorney, Agent, or Firm—Michael J. Bolan; Bingham McCutchen LLP

(57) ABSTRACT

A dual-mode transmission device is provided for use with a radio device configured for either push-to-talk operation or voice-operated operation. The dual-mode transmission device includes a mode selecting apparatus that may be switched between a first position in which a push-to-talk mode is enabled and a second position in which the push-to-talk mode is disabled, allowing a single headset or similar device to be used in either mode.

12 Claims, 4 Drawing Sheets

DUAL MODE TRANSMISSION DEVICE

FIELD OF THE INVENTION

The present invention relates to the field of devices used to control transmissions from radio devices.

BACKGROUND OF THE INVENTION

The Federal Communications Commission ("FCC") makes various frequency bands available for use by amateur and professional radio operators. Such channels may be simultaneously used by multiple users or user groups, in part due to restrictions on the ranges within which various radio devices may communicate.

For example, Family Radio Service ("FRS") is one of the Citizens Band Radio Services regulated by the FCC. The FRS is intended for families, friends and associates to use while on a work site, within a neighborhood, on group outings, etc. The FCC has allocated 14 different channels for FRS communications. FRS units may be used without a license, in part because their range is generally less than 1 mile.

Radio devices commonly known as "CB radios," having a range of 1 to 5 miles, are also regulated by the FCC under the Citizens Band Radio Services. The FCC allows unmodified CB units to be operated without a license.

Users of more powerful radio devices must by licensed by the FCC. For example, users who operate radios in the General Mobile Radio Service bands, having a range from 5 to 25 miles, require a license. Similarly, the FCC issues various levels of amateur or "ham" radio licenses. The level of training needed to obtain each license corresponds with the range of the radio to be licensed. Professional radio operators are subject to yet more rigorous licensing requirements.

Many radio devices use a push-to-talk ("PTT") circuit for transmitting signals. In order to send a voice transmission with a PTT unit, a user activates a PTT switch (typically by holding down a button) in series with a microphone. The user needs to hold down the PTT switch while speaking. Therefore, these radio units are inconvenient to use in some circumstances, e.g., when a user needs both hands free for other tasks.

Some radios include a voice-operated transmit ("VOX") circuit which allows a user to transmit a voice signal from the radio device merely by speaking into a radio microphone or the microphone of a headset used with the radio. VOX-enabled radios do not require a switch in series with the microphone, but instead begin to transmit automatically after a voice signal has been received by the microphone. Accordingly, a radio unit having a headset and a VOX circuit may be used in "hands free" mode.

Although radio devices having a headset and a VOX circuit are generally very convenient, they do not perform well in environments having high levels of background noise, such as on a factory floor, or where there is wind noise. In such environments, the radio sometimes will incorrectly interpret the background or wind noise as the user's speech and will start transmitting.

Radio devices having a PTT circuit generally provide better performance in noisy environments because the user may control when transmissions are made. However, even when used with a headset, PTT radio devices cannot provide a hands free mode of use.

Previously, if a user had wished to use a headset and change between VOX and PTT operation of a VOX-enabled radio unit, a user would have needed to carry a VOX headset and a PTT headset. A user may have known that she would be working in an environment which would be noisy some of the time, or may have known that she would be working outdoors where it may be windy. Carrying two headsets was inconvenient, but choosing one or the other would result in sub-optimal performance for changing conditions.

SUMMARY OF THE INVENTION

The present invention provides an audio device for use with a radio having a voice-operated transmit circuit and a push-to-talk switch for manually controlling transmission of audio signals, the audio device including: a microphone for detecting first audio signals to be transmitted by the radio; a push-to-talk switch for manually controlling transmission of the first audio signals; a speaker for reproducing second audio signals received from the radio; and a mode selecting apparatus which completes a circuit between the microphone and the radio, the mode selecting apparatus having a first position which enables the push-to-talk switch and a second position which disables the push-to-talk switch.

Some such embodiments include a waterproof covering. Some embodiments include an attachment device for securing the mode selecting apparatus in a desired location.

Some preferred embodiments of the present invention provide an audio device for use with a family radio service unit having a voice-operated transmit circuit for detecting audio signals and for controlling transmission of detected audio signals, the audio device including: a microphone for detecting first audio signals to be transmitted by the family radio service unit; a push-to-talk switch for manually controlling transmission of the first audio signals; a speaker for reproducing second audio signals received from the family radio service unit; a mode selecting apparatus which completes a circuit between the microphone and the radio, the mode selecting apparatus having a first position which enables the push-to-talk switch and a second position which disables the push-to-talk switch; a waterproof covering for the mode selecting apparatus; an attachment device for attaching the mode selecting apparatus in a desired location; a waterproof covering for the push-to-talk switch; and an attachment device for the push-to-talk switch, wherein the microphone and the speaker are disposed within a headset.

DESCRIPTION OF THE SPECIFIC EMBODIMENTS

Figure 1:
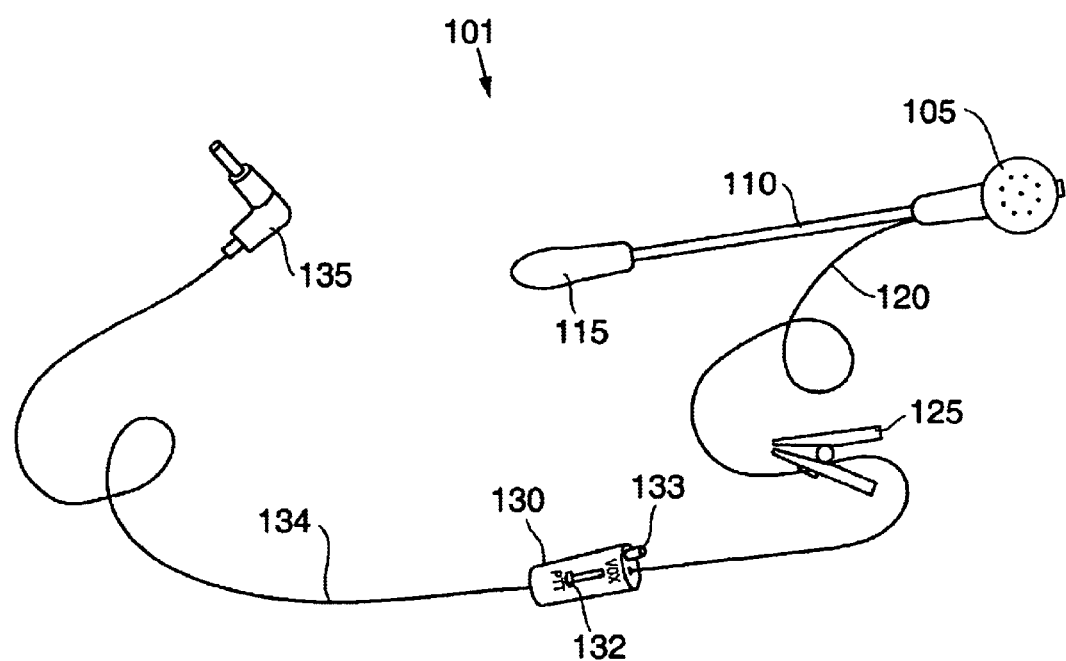
FIG. 1 depicts one preferred embodiment of the present invention.

FIG. 1 illustrates a headset which includes one preferred embodiment of a mode selecting apparatus according to the present invention. Headset 101 includes speaker 105, boom 110 and microphone 115.

When in use, speaker 105 is placed close to a user's ear. In one embodiment, speaker 105 is held adjacent to a user's ear canal using EARGEL™ earmolds manufactured by Jabra Corporation, the assignee of the present invention. Here, boom 110 couples speaker 105 with microphone 115, although boomless configurations are also envisioned by the inventors. Although different versions of speaker 105 may have a wide range of impedance, in one preferred embodiment speaker 105 has an impedance of 32 ohms and in another preferred embodiment speaker 105 has an impedance of 150 ohms.

Cord 120 carries signals between microphone 115 and mode selecting apparatus 130. Similarly, cord 134 carries signals between mode selecting apparatus 130 and plug 135. Cords 120 and 134 may be straight, coiled, retractable, or may have any other configuration known in the art.

Plug 135 is inserted in a radio device (not shown) when used in accordance with the present invention. As will be described below with respect to FIGS. 3 and 4, the present invention encompasses both single-plug and multiple-plug embodiments.

In the embodiment shown in FIG. 1, cord 120 is engaged with optional attachment device 125 for supporting cord 120 and/or mode selecting apparatus 130. Here, attachment device 125 is a clip designed to be attached to an article of a user's clothing. As will be described below with reference to FIG. 2, various attachment devices may advantageously be used, depending in part on the particular embodiment of the present invention and the use for which it is intended. Some embodiments include multiple attachment devices 125. In some such embodiments, one of the attachment devices 125 is engaged with mode selecting apparatus 130.

In some embodiments, attachment device 125 is a device configured for attachment to some portion of a motor vehicle. For example, attachment device 125 may include a suction cup for attaching mode selecting apparatus 130 to a windshield, a VELCRO™ or similar patch for attaching mode selecting apparatus 130 to a dashboard, a strap, loop or clamp for attaching mode selecting apparatus 130 to a steering column, to handlebars, etc.

Mode selecting apparatus 130 allows a user to select a VOX mode or a PTT mode for transmitting signals from microphone 115 via a radio device. When mode selecting apparatus 130 is in PTT mode, PTT switch 133 is enabled and when mode selecting apparatus 130 is in VOX mode, PTT switch 133 is disabled. It will be understood that if mode selecting apparatus 130 is in PTT mode and the associated radio device (such as radio 280 of FIG. 2) includes a VOX circuit, the VOX circuit of the associated radio may still be enabled.

In this embodiment, mode selecting apparatus 130 includes slide switch 132 for selecting a transmission mode, e.g., by moving slide switch 132 with a finger of a user's hand. Slide switch 132 is shown in PTT mode, wherein a user needs to engage PTT switch 133 in order to make a transmission. Preferably, mode selecting apparatus 130 includes both slide switch 132 and PTT switch 133, but in many embodiments PTT switch 133 is a distinct component and not within the housing of mode selecting apparatus 130.

In the embodiment shown in FIG. 1, PTT switch 133 is a push-button switch. However, in some embodiments, slide switch 132 and PTT switch 133 have alternative forms and can be any type of switch known by those of skill in the art. For example, PTT switch 133 can be a toggle switch, a lever, a rotatable switch, a grip switch, etc.

Figure 2:
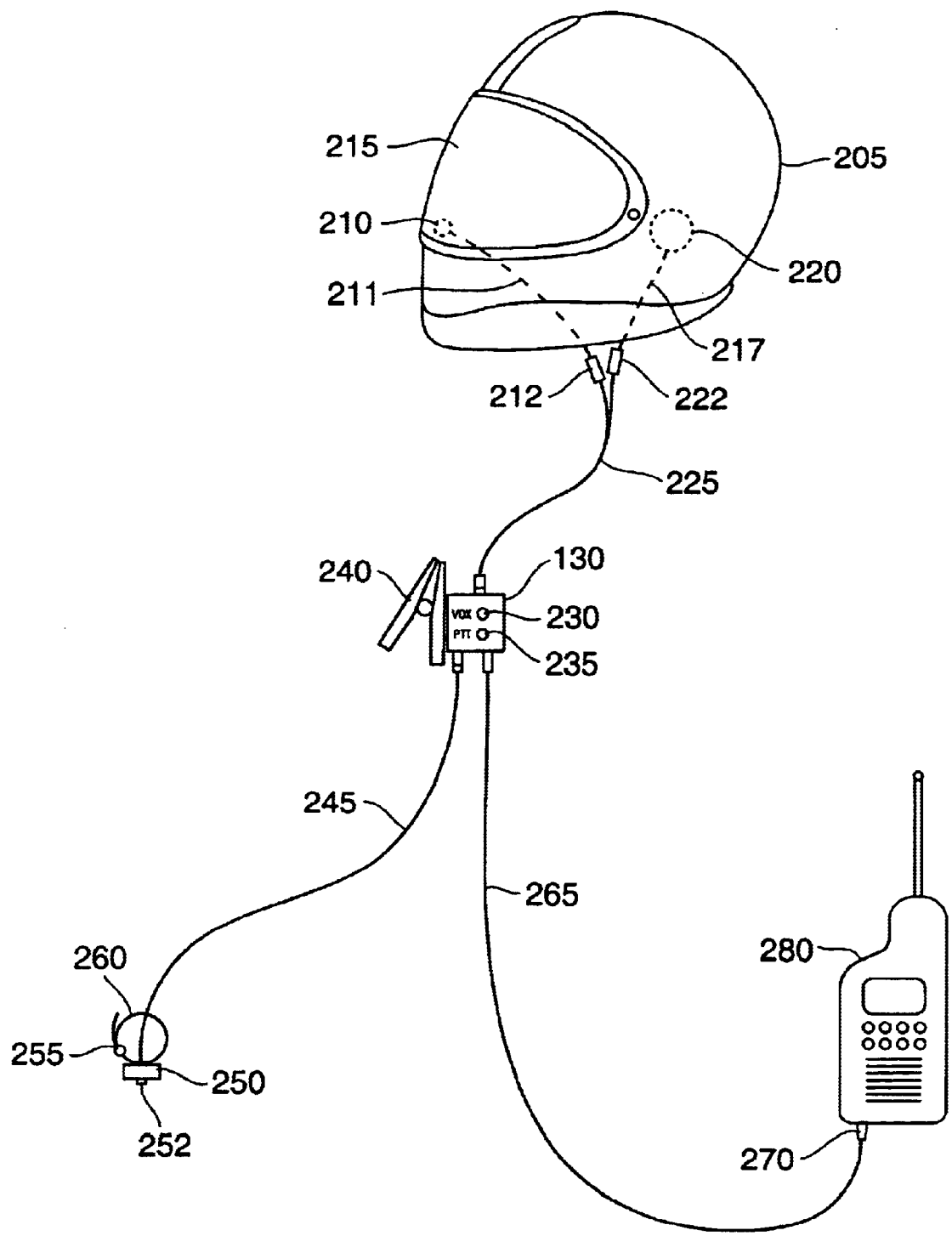
FIG. 2 illustrates an embodiment of the present invention for use when a user is wearing a helmet.

FIG. 2 illustrates an embodiment of the present invention for use with protective headgear such as helmet 205. Such embodiments are particularly advantageous for using a radio device while riding a motorcycle or while engaged in any other activity which requires head protection.

In this embodiment, a microphone and speakers are disposed in a helmet. Both the mode selecting apparatus and the PTT switch are positioned within reach of the user. The mode selecting apparatus provides a junction between the speaker and microphone cable(s), the radio device and the PTT switch.

Microphone 210 is preferably attached to an interior portion of helmet 205, because in this configuration microphone 205 may be shielded from the wind and partially shielded from ambient noise. In FIG. 2, microphone 210 is shown attached to the interior of visor 215. This attachment may be made with a suction cup, with an adhesive or in any convenient manner.

Speakers 220 are preferably positioned such that they will be located near a user's ears when a user is wearing helmet 205. Only one of speakers 220 is shown (in phantom) in FIG. 2, but in preferred embodiments at least one additional speaker 220 is disposed within helmet 205. However, in some embodiments of the present invention, helmet 205 includes only one speaker 220.

Cord 217 connects speakers 220 with cord 225, via optional coupler 222. In this embodiment, cord 225 conducts signals between mode selecting apparatus 130, speakers 220 and microphone 210. It is preferable to have a single cord make this connection in order to reduce the total number of cords required, to reduce the possibility of a user becoming entangled in cords, etc. However, in some embodiments, separate cords conduct signals between microphone 210 and mode selecting apparatus 130 and between mode selecting apparatus 130 and speakers 220.

It is preferable, though not essential, that microphone 210 and/or cord 211 is detachable from helmet 205 in order to facilitate the process of putting helmet 205 on the user's head. Similarly, it is preferable that cord 217 is not attached to speaker 220 when a user is putting on helmet 205. Otherwise, microphone 210 and/or cords 211, 217, and 225 and may become fouled or may obstruct the user's head as the user is putting on helmet 205. Accordingly, the embodiment shown in FIG. 2 includes couplers 212 and 222 for connecting and disconnecting cords 211 and 217, respectively.

In this embodiment, mode selecting apparatus 130 includes button 230 for selecting VOX-only operation and button 235 for selecting PTT operation. As noted above, mode selecting apparatus 130 is not limited to slide switch or button switch embodiments, but may have any type of switch known in the art. When VOX-only operation is selected, PTT switch 250 is disabled.

VOX-only operation will not generally be desirable unless microphone 210 is positioned to minimize wind noise. When microphone 210 is positioned on the inside of helmet 205, as shown, microphone 210 may be sufficiently protected from wind and ambient noise to allow for VOX mode operation.

In some preferred embodiments, mode selecting apparatus 130 has a waterproof casing formed of plastic, vinyl, one or more elastomers, or similar material. Preferably, mode selecting apparatus 130 may be operated without removing the waterproof casing.

In this embodiment, mounting device 240 is a clip configured to fasten mode selecting apparatus 130 to an article of a user's clothing, to a vehicle, etc., preferably within reach of the user. In other embodiments, mounting device 240 may be a suction cup, a strap made of VELCRO™ or similar material, a belt, adhesive material, a clamp, or may be any similar mounting device known in the art.

Cord 245 connects mode selecting apparatus 130 with PTT switch 250. In this embodiment, a user controls PTT switch 250 by pushing button 252. In other embodiments, PTT switch 250 includes other types of switching devices instead of button 252, including but not limited to a lever, toggle, trigger, rotatable grip, squeeze grip, etc. In preferred embodiments, PTT switch 250 has a waterproof casing and may be operated without removing the casing. Such a casing may be formed of vinyl, one or more elastomers, plastic or similar material.

In FIG. 2, PTT switch 250 is coupled to fastener 260 for easy attachment to a snowmobile steering column, motorcycle handle bars, a hang glider or ultralight aircraft frame, etc. In this embodiment, fastener 260 is a hose clamp adjusted by turning screw 255. In other embodiments, fastener 260 may be a suction cup, a strap made of VELCRO™ or similar material, a belt, adhesive material, or may have similar configurations known in the art.

Plug 270 connects cord 265 to radio 280. Radio 280 may be any type of radio, but in this embodiment radio 280 is a hand-held VOX-enabled FRS radio. Radio 280 is advantageously mounted in a holster (not shown) or a similar carrying device which may be attached to an article of the user's clothing, to a vehicle operated by the user, etc.

Embodiments similar to that depicted in FIG. 2 are very convenient for use while wearing other types of protective headgear, such as a hard hat. Mounting speakers within the headgear is convenient even if the protective headgear does not cover a user's ears. However, an ear-mounted or headband-mounted headset may also be used with such protective headgear. The headset may include one or more speakers, a microphone or both, and the corresponding devices will be disposed within the protective headgear. For example, the speakers may be situated in the protective headgear and the microphone may be part of the headset, or vice versa.

Figure 3:
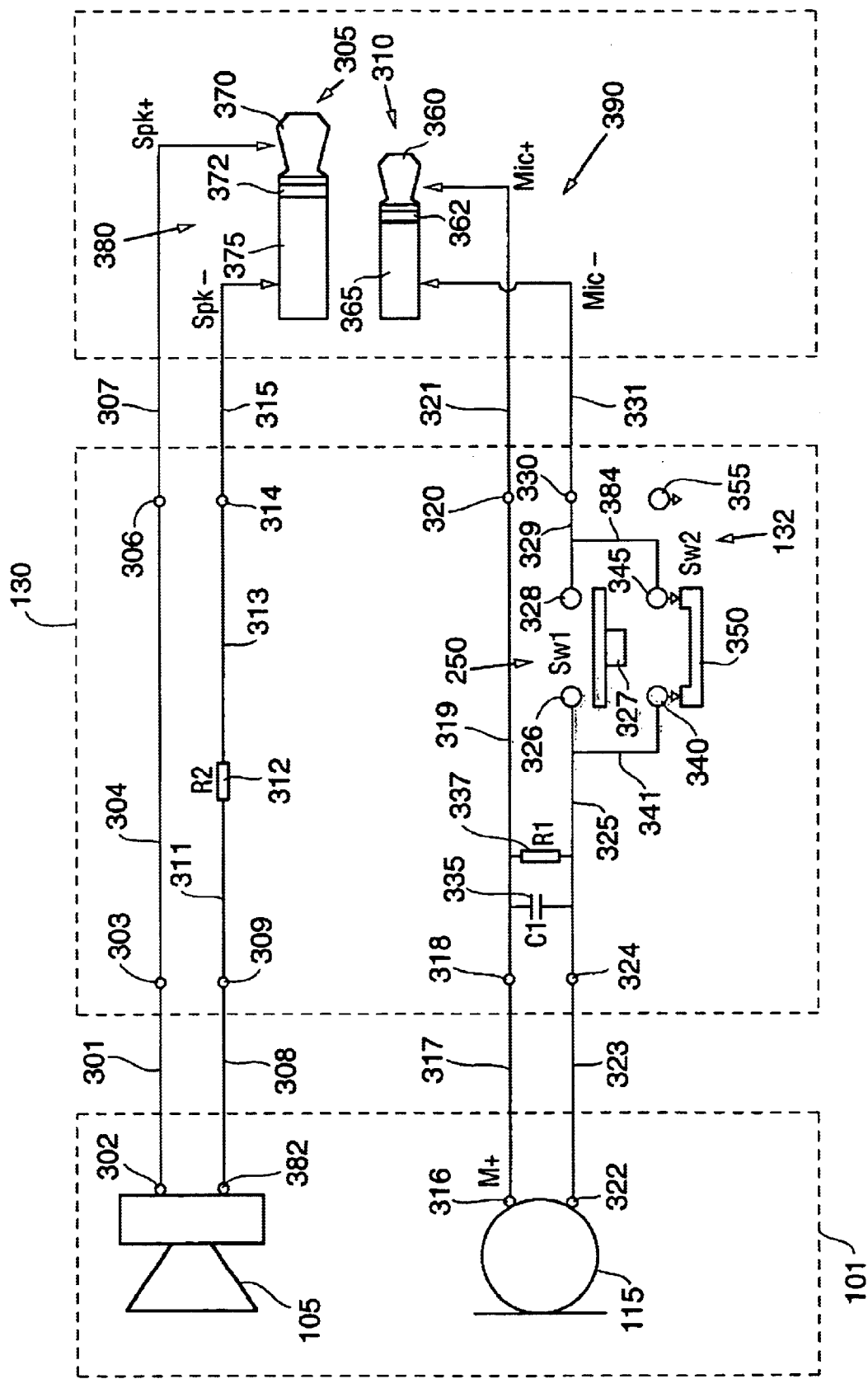
FIG. 3 is a circuit diagram of a dual-plug embodiment of a mode selecting apparatus according to the present invention.

FIG. 3 is a schematic diagram which indicates the circuitry of a dual-plug embodiment of mode selecting apparatus 130, speaker 105, microphone 115 and plugs 305 and 310. In summary, when plug 305 is engaged with a radio, circuit 380 is completed between the radio and speaker 105. In preferred embodiments, mode selecting apparatus 130 is used with headset 101. Although the embodiment of FIG. 3 is depicted and described with specific positive and negative leads, one of skill in the art will appreciate that the polarities of speaker 105 and microphone 115 could be reversed if microphone 115 is a non-polarized microphone.

Similarly, plug 310 connects microphone 115 to the radio when circuit 390 is closed. In preferred embodiments, the microphone is a headset microphone. Circuit 390 is controlled by mode selecting apparatus 130.

First, the components of one embodiment of circuit 380 will be described. Wire 301, most of which is disposed within a cord such as cord 120 of FIG. 1 or cord 225 of FIG. 2, connects positive lead 302 of speaker 105 with lead 303 of mode selecting apparatus 130. Wire 304 is disposed within mode selecting apparatus 130 and connects lead 303 with lead 306. Wire 307, most of which is disposed within a cord such as cord 134 of FIG. 1 or cord 265 of FIG. 2, connects lead 306 of mode selecting apparatus 130 with conductive region 370 of plug 305.

Similarly, wire 308, most of which is disposed within a cord such as cord 120 of FIG. 1 or cord 225 of FIG. 2, connects negative lead 382 of speaker 105 with lead 309 of mode selecting apparatus 130. Wires 311 and 313 are disposed within mode selecting apparatus 130. Wire 311 connects lead 309 with optional resistor 312 and wire 313 connects resistor 312 with lead 314.

The main purpose of optional resistor 312 is to attenuate a signal from radio 280 to speaker 105. Attenuating this signal is desirable if speaker 105 is sensitive and/or if radio 280 has a high maximum volume. The impedance of resistor 312 depends on the desired maximum volume of speaker 105, the maximum volume of radio 280, the sensitivity of speaker 105, and the impedance of speaker 105.

As noted above, in a first preferred embodiment speaker 105 has an impedance of 32 ohms and in a second preferred embodiment speaker 105 has an impedance of 150 ohms. To make the loudest radio bearable at maximum volume, an impedance of resistor 312 which is appropriate for the first embodiment would be approximately 180 ohms, resulting in an attenuation of approximately 16.4 dB. An impedance of resistor 312 which is appropriate for the second embodiment would be approximately 820 ohms, resulting in an attenuation of approximately 16.2 dB.

Wire 315, most of which is disposed within a cord such as cord 134 of FIG. 1 or cord 265 of FIG. 2, connects lead 314 of mode selecting apparatus 130 with conductive region 375 of plug 305. Conductive regions 370 and 375 of plug 305 are separated by insulator 372.

The following paragraphs describe the components of one embodiment of circuit 390 according to the present invention. Wire 317, most of which is disposed within a cord such as cord 120 of FIG. 1 or cord 225 of FIG. 2, connects positive lead 316 of microphone 115 with lead 318 of mode selecting apparatus 130. Wire 319 is disposed within mode selecting apparatus 130 and connects lead 318 with lead 320. Wire 321, most of which is disposed within a cord such as cord 134 of FIG. 1 or cord 265 of FIG. 2, connects lead 320 of mode selecting apparatus 130 with region 360 of plug 310.

Wire 323, most of which is disposed within a cord such as cord 120 of FIG. 1 or cord 225 of FIG. 2, connects negative lead 322 of microphone 115 with lead 324 of mode selecting apparatus 130. Wire 325 connects lead 324 with lead 326 of PTT switch 250. Similarly, wire 329 connects lead 328 of PTT switch with lead 330 of mode selecting apparatus 130. Wire 331, most of which is disposed within a cord such as cord 134 of FIG. 1 or cord 265 of FIG. 2, connects lead 330 of mode selecting apparatus 130 with conductive region 365 of plug 310. Conductive regions 360 and 365 of plug 310 are separated by insulator 362.

Although FIG. 3 indicates that PTT switch 250 is disposed within mode selecting apparatus 130, in other embodiments PTT switch is separate from mode selecting apparatus 130. In some such embodiments, at least a portion of wires 325 and 329 is disposed within a cord such as cord 245 of FIG. 2.

Slide switch 132 includes slide 350 and leads 340, 345 and 355. Wire 341 connects lead 340 of slide switch 132 with wire 325 and wire 384 connects lead 345 of slide switch 132 with wire 329.

When a user selects a VOX-only mode of operation, slide 350 is placed in electrical contact with leads 340 and 345. In this configuration, PTT switch 250 is bypassed and a VOX circuit (not shown) controls when transmissions are made of the signals received by microphone 115. The VOX circuit may be any VOX circuit known in the art and is typically incorporated into the radio to which the invention is coupled (e.g., radio 280 of FIG. 2).

When a user has selected operation in PTT mode by opening slide switch 132 of mode selecting apparatus 130, slide 350 is not in electrical contact with lead 340. In PTT mode, when a user desires to transmit a voice signal from microphone 115, a user engages PTT switch 250 by depressing button 327. This action places button 327 in contact with leads 326 and 328 and completes circuit 390, allowing a signal to be transmitted from microphone 115 to a radio device via plug 310.

Optional capacitor 335 is a radio frequency ("RF") bypass capacitor. The main purpose of optional capacitor 335 is to reduce RF pickup on microphone 115 in the presence of an interfering RF source. For example, in some preferred embodiments capacitor 335 has a capacitance of 56 picofarads to bypass radio emissions from devices using the Global System for Mobile Communications ("GSM"). However, some embodiments do not include capacitor 335, in part because radio users may not wish to use a cellular phone simultaneously.

Optional resistor 337 is a microphone load resistor. Some radios (for example, AUDIOVOX™ brand radios) will not transmit (or "key") when the microphone is switched into circuit 390 if the microphone current is too low. Putting resistor 337 in parallel with microphone 115 increases the bias current. Therefore, resistor 337 is included in some embodiments which are intended for AUDIOVOX™ brand radios and similar devices. In some such embodiments, the resistance of resistor 337 is approximately 5100 ohms. Other embodiments do not include resistor 337.

Figure 4:
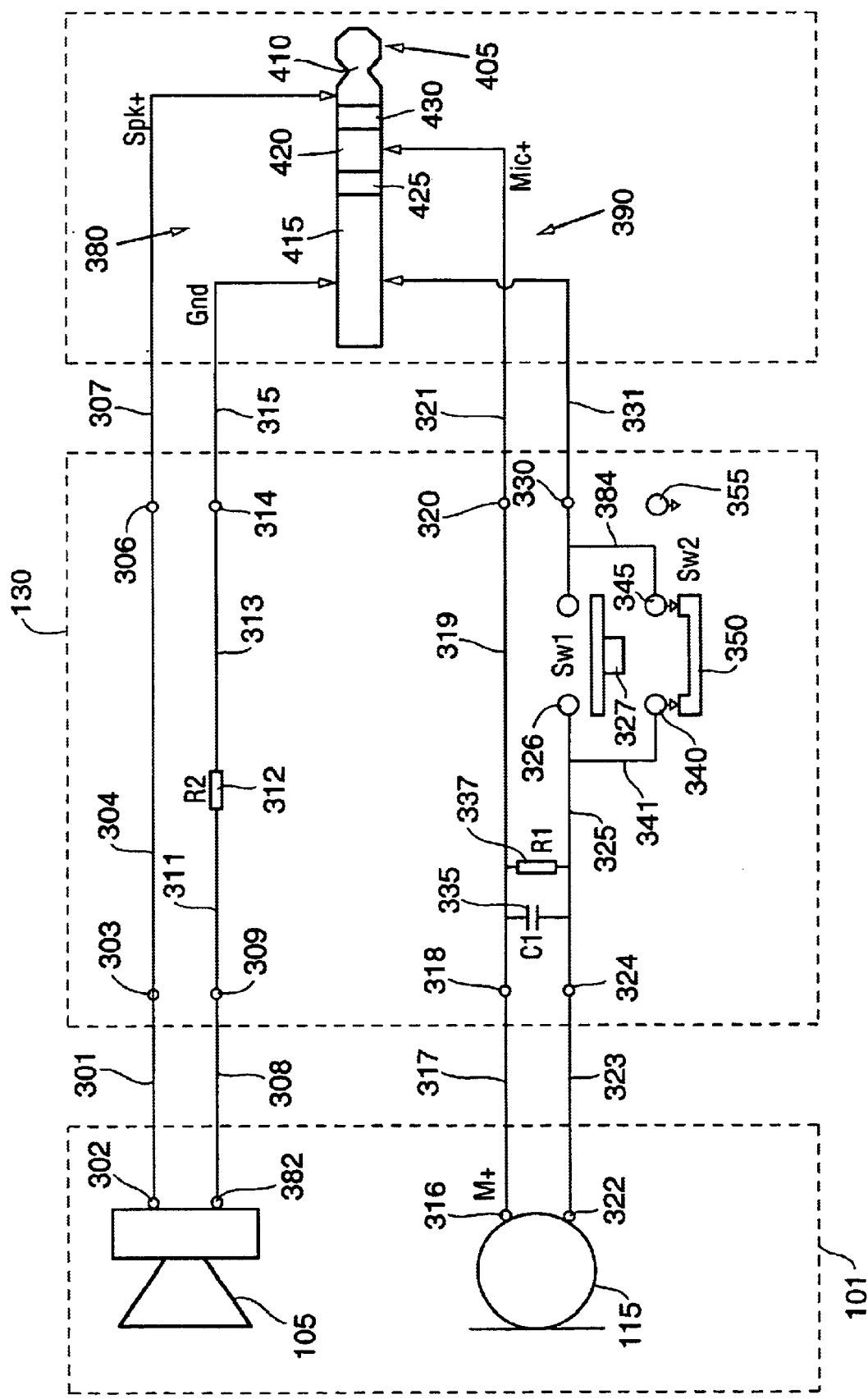
FIG. 4 is a schematic diagram of a single-plug embodiment of a mode selecting apparatus according to the present invention.

FIG. 4 depicts a single-plug embodiment of the present invention. This embodiment is substantially similar to that shown in FIG. 3 and described in the foregoing paragraphs. However, in this embodiment, both circuit 380 and circuit 390 may be completed by inserting plug 405 into a radio device.

This embodiment of circuit 380 is identical to that shown in FIG. 3, except as described in this paragraph. Wire 307 connects lead 306 of mode selecting apparatus 130 with conductive region 410 of plug 405. Wire 315 connects lead 314 of mode selecting apparatus 130 with ground region 415 of plug 405.

The embodiment of circuit 390 shown in FIG. 4 is identical to that shown in FIG. 3, except as follows. Lead 320 of mode selecting apparatus 130 is connected by wire 321 to conductive region 420 of plug 405. Wire 331 connects lead 330 of mode selecting apparatus 130 to ground region 415 of plug 405. Conductive regions 415 and 420 of plug 405 are separated by insulator 425. Insulator 430 separates conductive regions 410 and 420 of plug 405.

While the best mode for practicing the invention has been described in detail, those of skill in the art will recognize that there are numerous alternative designs, embodiments, modifications and applied examples that are within the scope of the present invention. Accordingly, the scope of this invention is not limited to the previously described embodiments.

I claim:

1. An audio device for use with a radio, the audio device comprising:
   a speaker for reproducing first audio signals received from the radio;
   a first circuit coupling said speaker and said radio;
   a microphone for detecting second audio signals to be transmitted by the radio;
   a push-to-talk switch;
   a second circuit coupling said microphone and said radio, wherein said second circuit includes said push-to-talk switch;
   a third circuit coupling said microphone and said radio, wherein said third circuit bypasses said push-to-talk switch; and
   a mode selecting switch with at least a first position and a second position, wherein said mode selecting switch in said first position enables said second circuit and said push-to-talk switch and wherein said mode selecting switch in said second position enables said third circuit and disables said push-to-talk switch.

2. The audio device of claim 1, further comprising a single plug, said single plug coupling said speaker and said microphone to said radio.

3. The audio device of claim 1, further comprising:
   a first plug, said first plug coupling said speaker to said radio; and
   a second plug, said second plug coupling said microphone to said radio.

4. The audio device of claim 1, wherein said first circuit coupling said speaker and said radio further comprises an attenuating resistor.

5. The audio device of claim 1, wherein said second and third circuits further comprise an RF bypass capacitor.

6. The audio device of claim 1, wherein said second and third circuits further comprise a microphone load resistor.

7. The audio device of claim 1, further comprising a waterproof covering for the mode selecting apparatus.

8. The audio device of claim 1, further comprising an attachment device for attaching the mode selecting apparatus in a desired location.

9. The audio device of claim 1, wherein the microphone and the speaker are configured to be disposed within protective headgear.

10. The audio device of claim 1, wherein the microphone and the speaker are disposed within a headset.

11. The audio device of claim 1, further comprising a housing which encloses both the mode selecting apparatus and the push-to-talk switch.

12. An audio device for use with a family radio service unit, the audio device comprising:
   a speaker for reproducing first audio signals received from the family radio service unit;
   a first circuit coupling said speaker and said family radio service unit;
   a microphone for detecting second audio signals to be transmitted by the family radio service unit;
   a push-to-talk switch;
   a second circuit coupling said microphone and said family radio service unit, wherein said second circuit includes said push-to-talk switch;
   a third circuit coupling said microphone and said family radio service unit, wherein said third circuit bypasses said push-to-talk switch; and
   a mode selecting switch with at least a first position and a second position, wherein said mode selecting switch in said first position enables said second circuit and said push-to-talk switch and wherein said mode selecting switch in said second position enables said third circuit and disables said push-to-talk switch;
   a waterproof covering for the mode selecting apparatus;
   an attachment device for attaching the mode selecting apparatus in a desired location;
   a waterproof covering for the push-to-talk switch; and
   an attachment device for the push-to-talk switch, wherein the microphone and the speaker are disposed within a headset.

* * * * *